(12) United States Patent
Gane et al.

(10) Patent No.: US 8,999,055 B2
(45) Date of Patent: Apr. 7, 2015

(54) METHOD FOR IMPROVING HANDLEABILITY OF CALCIUM CARBONATE CONTAINING MATERIALS

(75) Inventors: Patrick A. C. Gane, Rothrist (CH); Matthias Buri, Rothrist (CH); René Vinzenz Blum, St. Urban (CH); Samuel Rentsch, Aarburg (CH)

(73) Assignee: Omya International AG, Oftringen (CH)

( * ) Notice: Subject to any disclaimer, the term of this patent is extended or adjusted under 35 U.S.C. 154(b) by 25 days.

(21) Appl. No.: 13/879,947

(22) PCT Filed: Oct. 19, 2011

(86) PCT No.: PCT/EP2011/068258
§ 371 (c)(1),
(2), (4) Date: Jun. 3, 2013

(87) PCT Pub. No.: WO2012/055739
PCT Pub. Date: May 3, 2012

(65) Prior Publication Data
US 2014/0147370 A1    May 29, 2014

Related U.S. Application Data

(60) Provisional application No. 61/410,389, filed on Nov. 5, 2010.

(30) Foreign Application Priority Data

Oct. 29, 2010  (EP) .................................. 10189374

(51) Int. Cl.
| C09C 1/02 | (2006.01) |
| C04B 14/00 | (2006.01) |
| C04B 14/28 | (2006.01) |
| C22B 26/20 | (2006.01) |
| C01F 11/18 | (2006.01) |

(52) U.S. Cl.
CPC .............. C22B 26/20 (2013.01); *C01P 2004/62* (2013.01); *C01P 2006/10* (2013.01); *C01P 2006/22* (2013.01); *C01P 2006/82* (2013.01); C09C 1/021 (2013.01); C09C 1/024 (2013.01); C01F 11/18 (2013.01); *C01P 2004/61* (2013.01)

(58) Field of Classification Search
CPC ........... C01F 11/18; C09C 1/02; C09C 1/021; C04B 14/00; C04B 14/28
See application file for complete search history.

(56) References Cited

U.S. PATENT DOCUMENTS

| 4,561,597 | A | 12/1985 | Cook et al. | |
|---|---|---|---|---|
| 5,653,795 | A | * 8/1997 | Brown | ........................ 106/469 |
| 6,235,150 | B1 | * 5/2001 | Middleton et al. | ................. 162/9 |
| 2005/0025811 | A1 | 2/2005 | Levin et al. | |
| 2007/0264329 | A1 | 11/2007 | Stotler et al. | |
| 2007/0266898 | A1 | 11/2007 | Gane et al. | |
| 2008/0319115 | A1 | 12/2008 | Munchow | |
| 2010/0120948 | A1 | 5/2010 | Gane et al. | |
| 2010/0160498 | A1 | 6/2010 | Aarni et al. | |
| 2020/0160498 | | 6/2010 | Aarni et al. | |

FOREIGN PATENT DOCUMENTS

| JP | 545699 | A | 3/1979 |
| JP | 5446230 | A | 4/1979 |
| JP | 55165960 | A | 12/1980 |
| JP | 07300568 | A | 11/1995 |
| JP | 2001026666 | A | 1/2001 |
| TW | 200906984 | A | 2/2009 |
| WO | 9108341 | A1 | 6/1991 |
| WO | 0100712 | A1 | 1/2001 |
| WO | 0100713 | A1 | 1/2001 |
| WO | 2006008657 | A2 | 1/2006 |

OTHER PUBLICATIONS

The International Search Report for PCT Application No. PCT/EP2011/068258.
The Written Opinion of the International Searching Authority for PCT Application No. PCT/EP2011/068258.
Foster et al. "The effect of calcium carbonate particle size and shape on the properties and performance of calcium carbonate granulations." Apr. 2, 2009.

* cited by examiner

*Primary Examiner* — Pegah Parvini
(74) *Attorney, Agent, or Firm* — Amster, Rothstein & Ebenstein LLP

(57) ABSTRACT

The present invention concerns a calcium carbonate containing material having increased bulk density at equal or improved flowability, and a method of producing such a material. The inventive process comprises the step of contacting a calcium carbonate containing mineral powder with a solution or emulsion or dispersion of a binder.

32 Claims, No Drawings

METHOD FOR IMPROVING HANDLEABILITY OF CALCIUM CARBONATE CONTAINING MATERIALS

CROSS-REFERENCE TO RELATED APPLICATIONS

This application is a U.S. national phase of PCT Application No. PCT/EP2011/068258, filed Oct. 19, 2011, which claims priority to European Application No. 10189374.1, filed Oct. 29, 2010 and U.S. Provisional Application No. 61/410,389, filed Nov. 5, 2010.

The invention relates to calcium carbonate containing materials, and more specifically to calcium carbonate containing mineral powders having an increased bulk density, and a method of producing the same.

Inorganic materials are used in the manufacture of paper, paints, plastics and similar products, and it is well-known to incorporate quantities of inorganic materials into fibrous web, paints or plastics in order to improve the quality of the resulting products. Among the materials, which have thus found increasing acceptance as fillers in such applications, are calcium carbonate containing minerals. Materials of this type are generally prepared by dry grinding or wet grinding and drying, which may have been initially subjected to prior beneficiation steps in order to remove certain impurities, for example, for the purpose of improving brightness in the ultimate product. These dry powders, however, have the disadvantage that they have a low bulk density, which makes them difficult to handle. Calcium carbonate containing mineral powder products, for example, are usually sold by the manufacturer as a finally pulverized low bulk density powder, which powder has a limited storage capacity. Moreover, such products are typically bagged or shipped in bulk, however, due to the low bulk density, typically only 25 to 35 tons of powder can be loaded into a 40 m$^3$ rail car.

In the past, efforts have been made to increase the bulk density of such powders using compaction equipment, such as bricketting machines or pelletizers. However, these have proved to be unacceptable for several reasons. When the bulk density of such powders is increased mechanically by pressure, the flow properties of such powders are getting worse. Higher energy input is needed to load the product into a tank or container or to empty such a tank or container. Further, pelletizing equipment, which relies upon water as a binder, has been found to require the addition of large quantities of water (roughly 15 to 25 wt.-% of the weight of the calcium carbonate) before acceptable pellets can be formed. This water either increases the shipping costs of the product or increases production costs because it must be evaporated prior to shipment. Pelletizing equipment relying upon binders other than water also requires large amounts of binder and is found to result in a pelletized product which is difficult to make-down in water after pelletization and drying.

U.S. Pat. No. 4,561,597 describes a method for increasing the bulk density and decreasing the time of wetting with water of a substantially anhydrous kaolin clay powder, comprising dry ball-milling said powder using specific energy inputs, followed by pulverization in a high energy impact mill and classification to eliminate undesirable larger particles.

WO 2006/008657 relates to a method for producing pigmentary particles that are self-binding, said method comprising the steps of forming an aqueous suspension of an inorganic material and introducing the same into a grinder, forming an aqueous solution or suspension or aqueous emulsion of at least one binding agent and introduced the same into a grinder, and grinding the aqueous suspension together with the aqueous solution or suspension or emulsion in such a way as to obtain an aqueous suspension of self-binding pigmentary particles.

A method for the manufacture of dry pigment granulates is described in WO 01/00712. The method comprises the steps of mixing organic polymer pigments, optionally inorganic pigments, binders and water into a dispersion, and spray drying the dispersion. The binder binds the particles into agglomerates, which are easier to handle in powder form without dusting problems.

WO 01/00713 relates to a method for producing a plastic polymer pigment, wherein an aqueous dispersion of a plastic polymer pigment is dried. The obtained plastic pigment particles are bonded together with electrostatic forces to form agglomerates.

There remains a need in the art for a method to improve the bulk handling characteristics of calcium carbonate containing mineral powders.

Accordingly, it is an object of the present invention to provide a method for preparing calcium carbonate containing mineral powders that have improved bulk handling characteristics, e.g., when the powder is stored, loaded, unloaded and shipped. Another object of the present invention is to provide calcium carbonate containing mineral powders that require less storage capacity than conventional calcium carbonate containing mineral powders, and thus, allow reduction of the storage costs of such powders. It would be desirable to provide a method for preparing calcium carbonate containing mineral powders having an increased bulk density at equal or improved flowability compared to conventional calcium carbonate containing mineral powders. It would be also desirable to provide a calcium carbonate containing mineral powder, wherein a lower energy input is needed to load the powder into a container or to unload it from a container. It would also be desirable to provide a calcium carbonate containing mineral powder having an increased bulk density, wherein all other characteristics and/or properties of conventional calcium carbonate containing particles are at least maintained or even improved. It would also be desirable to provide a calcium carbonate containing mineral powder having an increased bulk density that can be easily suspended in water.

The foregoing and other objects are solved by the provision of a process for preparing calcium carbonate containing composite particles comprising the following steps:

a) providing at least one calcium carbonate containing mineral powder, b) preparing at least one solution or emulsion or dispersion of at least one binder, and c) contacting the at least one calcium carbonate containing mineral powder of step a) with the at least one solution or emulsion or dispersion of the binder of step b) in an amount to form solid calcium carbonate containing composite particles, wherein the dried calcium carbonate containing composite particles at a total surface moisture content of less than 0.5 wt.-%, based on the total weight of the composite particles, have increased bulk density at equal or improved flowability compared to the calcium carbonate containing mineral powder provided in step a).

According to another embodiment of the present invention, calcium carbonate containing composite particles are provided having increased bulk density at equal or improved flowability, obtainable by a process as described above.

According to still another embodiment of the present invention, a binder is used to increase the bulk density of a calcium carbonate containing mineral powder at equal or improved flowability.

According to still another embodiment the present invention, the inventive calcium carbonate containing composite particles are used in paper applications, in paints, or in plastics.

Advantageous embodiments of the present invention are defined in the corresponding sub-claims.

According to one embodiment the bulk density of the dried calcium carbonate containing particles at a total surface moisture content of less than 0.5 wt.-%, based on the total weight of the composite particles, is increased by 5 to 80%, preferably by 8 to 60%, and more preferably by 10 to 50%, compared to the calcium carbonate containing mineral powder provided in step a).

According to one embodiment the at least one calcium carbonate containing mineral powder provided in step a) is selected from the group consisting of GCC and PCC, and mixtures thereof. According to another embodiment the powder particles of the at least one calcium carbonate containing mineral powder provided in step a) have a weight median particle size $d_{50}$ value from 0.1 to 100 µm, from 0.3 to 50 µm, or from 0.4 to 10 µm, preferably from 0.5 to 5.0 µm. According to still another embodiment the at least one calcium carbonate containing mineral powder provided in step a) has a total surface moisture content of less than 10 wt.-%, less than 5 wt.-%, less than 2 wt.-%, less than 1 wt.-%, preferably less than 0.5 wt.-%, more preferably less than 0.2 wt.-%, and most preferably less than 0.1 wt.-%, based on the total weight of the mineral powder.

According to one embodiment the at least one binder provided in step b) is selected from a polymeric binder selected from the group comprising copolymers of acrylonitrile, butadiene, acrylate, butyl acrylate, styrene, styrene-butadiene, and acrylic ester, and mixtures thereof, and preferably the at least one binder provided in step b) is selected from the group comprising styrene-acrylate-copolymer and styrene-butadiene-copolymer, and mixtures thereof. According to another embodiment the amount of the at least one binder provided in step b) is less than 10 wt.-%, preferably less than 7 wt.-%, more preferably less than 5 wt.-%, and most preferably between 0.1 and 4 wt.-%, based on the total weight of the calcium carbonate containing mineral powder.

According to one embodiment the at least one calcium carbonate containing mineral powder provided in step a) is contacted before, during or after step c) with at least one solution or emulsion or dispersion of at least one cationic polymer. According to another embodiment the at least one cationic polymer is selected from linear polyethylenimine, or polyamine amide epichlorohydrin, or mixtures thereof. According to still another embodiment the amount of the at least one cationic polymer is less than 1.0 wt.-%, preferably less than 0.8 wt.-%, more preferably less than 0.5 wt.-%, and most preferably less than 0.2 wt.-%, based on the total weight of the calcium carbonate containing mineral powder.

According to one embodiment the process step c) is carried out at a temperature from 5° C. to 140° C., preferably from 10 to 110° C., and most preferably from 20° C. to 105° C., or from 40 to 105° C.

According to one embodiment the inventive process comprises a further step d), wherein the calcium carbonate containing composite particles obtained in step c) are dried, preferably to a total surface moisture content of less than 1 wt.-%, less than 0.8 wt.-%, less than 0.5 wt.-%, preferably less than 0.2 wt.-%, and most preferably less than 0.1 wt.-%, based on the total weight of the composite particles.

According to another embodiment the inventive process comprises a further step e), wherein the dried calcium carbonate containing composite particles obtained in step d) are screened and/or air classified to eliminate undesired larger particles, preferably to eliminate particles being greater than 100 µm, preferably being greater than 50 µm, and more preferably being greater than 20 µm.

According to one embodiment the process step c) is carried out in a milling device, preferably in a ball mill, preferably in combination with a cyclone device that re-circulates agglomerates and/or aggregates formed during process step c) back to the inlet of the milling device. According to another embodiment the calcium carbonate containing composite particles formed during process step c) are divided into smaller particles.

According to one embodiment a slurry is prepared from the calcium carbonate containing composite particles obtained in process step c) by addition of water and, optionally, a dispersant. According to another embodiment the dispersant is sodium polyacrylate having a weight average molecular weight $M_w$ from 2000 to 15000 g/mol, preferably from 3000 to 7000 g/mol, and most preferably from 3500 to 6000 g/mol. According to still another embodiment the slurry has a solid content from 10 to 82 wt.-%, preferably from 50 to 81 wt.-%, and more preferably from 60 to 70 wt.-% or from 70 to 78 wt.-%, based on the total weight of the slurry.

The term "binder" as used in the present invention is a compound that is conventionally used to bind together two or more other materials in mixtures. However, in the process of the present invention the binder has an effect other than aggregation, namely the effect of improving the bulk density of calcium carbonate containing mineral powders at equal or improved flowability.

"Bulk density" in the meaning of the present invention is a property of powders, granules and other "divided" solids and is defined as the mass of many particles of the material divided by the total volume they occupy. The total volume includes particle volume, inter-particle void volume and internal pore volume. The bulk density of the present invention can be measured with a Powder Rheometer System FT4 (Freeman Technology Ltd., UK) and is specified in kg/dm³.

For the purpose of the present invention, the term "calcium carbonate containing mineral powder" comprises "ground calcium carbonate" (GCC) and/or "precipitated calcium carbonate" (PCC). The at least one calcium carbonate containing mineral powder has a total surface moisture content of less than 10 wt.-%, based on the total weight of the mineral powder.

The term "dried" calcium carbonate containing composite particles is understood to refer to calcium carbonate containing composite particles having a total surface moisture content of less than 0.5 wt.-%, preferably less than 0.2 wt.-%, based on the total weight of the composite particles.

The term "energy consumption" as used in the present invention is a measure for the energy that is needed to move one metric ton of powder or particles. Throughout the present invention, the energy consumption is used as a measure for the "flow properties" of bulk solids; the lower the energy consumption, the better the flow properties of a bulk solid. The "energy consumption" of the present invention can be determined using a Powder Rheometer System FT4 (Freeman Technology Ltd., UK) and is specified in kJ/t.

"Flowability" in the meaning of the present invention is a property of powders, granules and other "divided" solids and is defined by the energy consumption for powder movement of the powder product. The flowability of the present invention can be measured with a Powder Rheometer System FT4 (Freeman Technology Ltd., UK) and is specified in kJ/t.

"Ground calcium carbonate (GCC)" in the meaning of the present invention is a calcium carbonate obtained from natural sources including marble, chalk or limestone, and processed through a treatment such as wet and/or dry grinding, screening and/or fractionizing wet and/or after drying, for example, by a centrifuge or cyclone.

Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ greater than 0.5 µm, a Sedigraph 5100 device from the company Micromeritics, USA, can be used.

"Precipitated calcium carbonate (PCC)" in the meaning of the present invention is a synthesized material, generally obtained by precipitation following the reaction of carbon dioxide and lime in an aqueous environment or by precipitation of a calcium and carbonate source in water, for example by sodium carbonate and calcium chloride.

The term "powder" as used in the present invention, encompasses solid mineral powders of at least 90 wt.-% inorganic mineral matter, based on the total weight of the powder, wherein the powder particles have a $d_{50}$ value of 100 µm or less, preferably less than 50 µm, and more preferably less than 10 µm, most preferably between 0.5 µm and 5.0 µm.

For the purpose of the present invention, a "slurry" comprises insoluble solids and water, and, optionally, further additives, and usually contains large amounts of solids and, thus, is more viscous and generally of higher density than the liquid from which it is formed.

The term "solid" calcium carbonate containing composite particles in the meaning of the present invention refers to calcium carbonate containing composite particles having a solid content of at least 90 wt.-% based on the total weight of the composite particles.

For the purpose of the present invention, the term "total surface moisture content" refers to the amount of water absorbed on the surface of the calcium carbonate containing mineral powder and/or the calcium carbonate containing composite particles and the pores within the calcium carbonate containing mineral powder and/or the calcium carbonate containing composite particles. The wt.-% water of the present invention is determined according to the Coulometric Karl Fischer measurement method, wherein the mineral powder and/or the composite particles are heated to 220° C., and the water content released as vapour and isolated using a stream of nitrogen gas (at 100 ml/min) is determined in a Coulometric Karl Fischer unit.

The inventive process for preparing calcium carbonate containing composite particles having increased bulk density at equal or improved flowability comprises the steps of (a) providing at least one calcium carbonate containing mineral powder, (b) preparing at least one solution or emulsion or dispersion of at least one binder, (c) contacting the at least one calcium carbonate containing mineral powder of step a) with the at least one solution or emulsion or dispersion of the binder of step b) in an amount to form solid calcium carbonate containing composite particles, wherein the dried calcium carbonate containing composite particles at a total surface moisture content of less than 0.5 wt.-%, based on the total weight of the composite particles, have increased bulk density at equal or improved flowability compared to the calcium carbonate containing mineral powder provided in step a).

The inventors surprisingly found that the bulk density of calcium carbonate containing mineral powders can be improved at equal or improved flowability by contacting a dry calcium carbonate containing mineral powder with a solution or emulsion or dispersion of a binder.

Without being bound to any theory, it is believed that the binder alters the particle shape of the calcium carbonate containing mineral powder and counteracts aggregation of the powder particles. This results in an improvement in packing and flow properties of the calcium carbonate containing mineral powder. However, the characteristics of the calcium carbonate containing minerals powder are not impaired to any substantial degree by the inventive method, i.e. all of the desirable material characteristics such as opacity, binding properties etc. remain substantially intact or are even improved.

Process Step a): The at Least One Calcium Carbonate Containing Mineral Powder

The at least one calcium carbonate containing mineral powder that may be used in the inventive process can comprise a calcium carbonate, for example, being in the form of a ground calcium carbonate (GCC), or a precipitated calcium carbonate (PCC), or a mixture thereof.

A natural ground calcium carbonate (GCC) may feature, e.g., one or more of marble, limestone, chalk, and/or dolomite. According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate containing mineral powder comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well known processes, e.g. by flocculation, filtration or forced evaporation prior to drying. The subsequent step of drying may be carried out in a single step such as spray drying, or in at least two steps. It is also common that such a mineral material undergoes a beneficiation step (such as a flotation, bleaching or magnetic separation step) to remove impurities.

A precipitated calcium carbonate (PCC) may feature, e.g., one or more of aragonitic, vateritic and/or calcitic mineralogical crystal forms. Aragonite is commonly in the acicular form, whereas vaterite belongs to the hexagonal crystal system. Calcite can form scalenohedral, prismatic, spheral, and rhombohedral forms. PCC can be produced in different ways, e.g., by precipitation with carbon dioxide, the lime soda process, or the Solvay process in which PCC is a by-product of ammonia production. The obtained PCC slurry can be mechanically dewatered and dried.

According to one embodiment of the present invention the at least one calcium carbonate containing mineral powder provided in step a) is selected from the group consisting of GCC and PCC, and mixtures thereof.

According to a preferred embodiment of the present invention the at least one calcium carbonate containing mineral powder comprises ground calcium carbonate (GCC).

In addition to calcium carbonate, the calcium carbonate containing mineral powder may comprise further metal oxides such as titanium dioxide and/or aluminum trioxide, metal hydroxides such as aluminum trihydroxide, metal salts such as sulfates, silicates such as talc and/or kaolin clay and/or mica, carbonates such as magnesium carbonate, and/or gypsum, satin white and mixtures thereof.

According to one embodiment of the present invention, the amount of calcium carbonate in the calcium carbonate containing material powder is at least 90 wt.-%, e.g., at least 95 wt.-%, preferably at least 99 wt.-%, more preferably at least 99.5 wt.-%, or most preferably at least 99.8 wt.-%, based on the total weight of the calcium carbonate containing mineral powder.

The total surface moisture content of the at least one calcium carbonate containing mineral powder is less than 10 wt.-%, based on the total weight of the mineral powder. According to one embodiment of the present invention, the moisture content of the at least one calcium carbonate containing mineral powder is less than 10 wt.-%, less than 5 wt.-%, less than 2 wt.-%, less than 1 wt.-%, preferably less than 0.5 wt.-%, more preferably less than 0.2 wt.-%, and most preferably less than 0.1 wt.-%, based on the total weight of the mineral powder.

In one preferred embodiment, the at least one calcium carbonate containing mineral powder has a total surface moisture content of between 0.01 wt.-% and 1.0 wt.-%, preferably between 0.02 wt.-% and 0.9 wt.-% and more preferably between 0.03 wt.-% and 0.09 wt.-% based on the total weight of the calcium carbonate containing mineral powder, even after exposure for 48 hours at 23° C. to a moisture atmosphere having a relative humidity of 50%.

The powder particles of the calcium carbonate containing mineral powder may feature a $d_{50}$ value from 0.1 to 100 μm, from 0.3 to 50 μm, or from 0.4 to 10 μm. Preferably, the powder particles of the calcium carbonate containing mineral powder have a $d_{50}$ value from about 0.5 to 5.0 μm.

Process Step b): The at Least One Solution or Emulsion or Dispersion of at Least One Binder In step b) of the inventive process, at least one solution or emulsion or dispersion of at least one binder is prepared. Suitable binders are, for example, binders of natural origin, e.g., starch, proteins such as casein, cellulose and cellulosic derivatives such as ethylhydroxyethyl cellulose (EHEC) and/or carboxymethylcellulose (CMC), or synthetic binders, e.g., polyvinyl acetate (PVA), acrylic binders such as acrylic ester binders and/or acrylonitrile binders and/or styrene-acrylate binders, styrene binders, styrene-butadiene binders and butadiene binders, or mixtures thereof.

According to a preferred embodiment of the present invention, the at least one binder is a synthetic binder, for example, a polymeric binder.

According to another embodiment of the present invention, the at least one binder is a polymeric binder selected from the group comprising copolymers of acrylonitrile, butadiene, acrylate, butyl acrylate, styrene, styrene-butadiene, and acrylic ester, and mixtures thereof. Examples for suitable polymeric binders are poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, or copolymers of vinylacetate and n-butylacrylate.

According to an embodiment of the present invention, the at least one binder is an anionic polymeric binder. Suitable anionic polymeric binders are, for example, carboxylate-containing polymers like copolymers of olefinically unsaturated carboxylic acids such as monocarboxylic acids like acrylic and/or methacrylic acids, or such as dicarboxylic acids like maleic acid or maleic anhydride and/or fumaric and/or itaconic and/or citraconic acids, or such as tricarboxylic acids like aconitic acid in combination with acrylonitrile, butadiene, monovinylidene aromatic monomers such as styrene and styrene derivatives like alpha-methylstyrene and/or ortho-, metha-, paramethylstyrene, styrene-butadiene, olefinically unsaturated esters such as acrylic and/or methacrylic alkyl ester like butyl acrylate, ethyl acrylate, 2-ethylhexyl acrylate, butyl methacrylate and mixtures thereof. Examples for suitable polymeric binders are poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, or copolymers of vinylacetate and n-butylacrylate.

According to a preferred embodiment of the present invention, the at least one binder is a thermoplastic polymer selected from the group comprising homo- and/or copolymers of ethylene methyl acrylate, ethylene acrylic acid, polyacetate, polybutylene, polybutylene terephthalate, polyphthalate carbonate, polyethylene terephthalate, polylactic acid, styrene acrylonitrile, acrylonitrile styrene acrylate, polyethersulfone, polystyrene, polyethylene, high density polyethylene, polypropylene, ethylene vinyl acetate, nylon, polyester, polyvinyl chloride, ethylene vinyl alcohol, polycarbonate, acrylonitrile butadiene styrene, polyoxymethylene, polyoxymethyl methacrylate, or mixtures thereof. The homo- and/or copolymers may be crosslinkable or non-crosslinkable. According to one exemplary embodiment, the at least one binder is a thermoplastic polymer comprising comonomers of $C_3$-$C_{12}$-α-olefines, preferably selected from the group comprising but-1-ene, hex-1-ene, 4-methyl-pent-1-ene, hept-1-ene, oct-1-ene, and dec-1-ene, more preferably selected from the group comprising but-1-ene, and hex-1-ene.

According to a preferred embodiment, the at least one binder is selected from the group comprising styrene-acrylate-copolymer and styrene-butadiene-copolymer, and mixtures thereof.

According to one embodiment of the present invention, the solution or emulsion or dispersion of the at least one binder is a water-based solution or emulsion or dispersion, i.e. the solvent used to prepare the solution or emulsion or dispersion is water.

According to a preferred embodiment of the present invention, the at least one binder is provided in form of a water-based dispersion. In case the binder is provided in the form of a dispersion, the particle size of the binder can have a $d_{50}$ value from 10 to 800 nm, preferably from 20 to 500, and more preferably from 25 to 100 nm.

However, the at least one binder also may be provided in form of a solution or an emulsion or in form of a mixture of a solution and/or an emulsion and/or a dispersion.

According to one embodiment of the present invention, the amount of the at least one binder is less than 10 wt.-%, preferably less than 7 wt.-%, more preferably less than 5 wt.-%, and most preferably between 0.1 and 4 wt.-%, based on the total weight of the calcium carbonate containing mineral powder.

According to one embodiment of the present invention, the at least one solution or emulsion or dispersion of the at least one binder of step b) contains 10 to 70 wt.-% binder, preferably 40 to 65 wt.-%, and more preferably 45 to 55 wt.-%, based on the total weight of the solution or emulsion or dispersion.

According to one embodiment of the present invention, the amount of the at least one solution or emulsion or dispersion of the at least one binder of step b) is less than 10 wt.-%, preferably less than 7 wt.-%, more preferably less than 5 wt.-%, and most preferably between 0.1 and 4 wt.-%, based on the total weight of the calcium carbonate containing mineral powder.

Process Step c): Contacting Calcium Carbonate Containing Mineral Powder and Binder In process step c) the at least one calcium carbonate containing mineral powder of step a) is contacted with the at least one solution or emulsion or dispersion of the binder of step b) in an amount to form solid calcium carbonate containing composite particles.

The at least one solution or emulsion or dispersion of the binder of step b), and optionally further components, is/are added in amounts to form solid calcium carbonate containing composite particles. It should be noted that the solution or emulsion or dispersion of the binder of step b), and optionally further components, is/are added to the calcium carbonate containing mineral powder in an amount which ensures that a solid product is obtained, i.e. a product that has a final solid content of at least 90 wt.-%, based on the total weight of the product. In other words, the formation of a liquid reaction mixture by adding huge amounts of solution or emulsion or dispersion of the binder of step b), and optionally further components, is to be avoided, if necessary by heat and/or vacuum.

The contacting of the at least one calcium carbonate containing mineral powder with the at least one solution or emulsion or dispersion of the binder of step b) may be carried out under mixing and/or homogenizing conditions. The skilled person will adapt these mixing and/or homogenizing conditions such as the mixing speed and temperature according to his process equipment.

For example, the mixing and homogenizing may take place by means of a plowshare mixer. Plowshare mixers function by the principle of a fluidized bed produced mechanically. Plowshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany.

According to one embodiment of the present invention, process step c) is carried out using a fluidized bed mixer or plowshare mixer.

According to another embodiment of the present invention, process step c) is carried out in a milling device, preferably in a ball mill, preferably in combination with a cyclone device that re-circulates agglomerates and/or aggregates formed during process step c) back to the inlet of the milling device. A cyclone device enables the separation of particulate material such as particles, agglomerates or aggregates, into fractions of smaller and larger particulate material based on gravity.

According to an experimental embodiment, the calcium carbonate containing composite particles formed during process step c) are divided into smaller particles. The term "dividing" as used in the present invention means that particles are split into smaller particles. This may be done by grinding, e.g., using a ball mill, a hammer mill, a rod mill, a vibrating mill, a roll crusher, a centrifugal impact mill, a vertical bead mill, an attrition mill, a pin mill, a hammer mill, a pulveriser, a shredder, a de-clumper, or a knife cutter. However, any other device that is able to divide the calcium carbonate containing composite particles formed during process step c) into smaller particles may be used.

The process step c) may be carried out at room temperature, i.e. at 20° C., or at other temperatures. According to one embodiment the process step c) is carried out at a temperature from 5 to 140° C., preferably from 10 to 110° C., and most preferably from 20 to 105° C. Without being bound to any theory, it is believed that the adhesion of the binder to the surface of the calcium carbonate containing mineral powder can be improved by carrying out process step c) at a temperature above room temperature, e.g., between 40 and 105° C. Heat may be introduced by internal shear or by an external source or a combination thereof.

According to an exemplary embodiment of the invention, the at least one calcium carbonate containing mineral powder is preheated before it is contacted with at least one solution or emulsion or dispersion of the binder of step b). For example, the calcium carbonate containing mineral powder may be preheated to a temperature from 30 to 100° C., from 40 to 90° C., or preferably from 50 to 80° C.

According to one embodiment of the present invention, process step c) is carried out for at least 1 s, preferably for at least 1 min, e.g., for at least 15 min, 30 min, 1 hour, 2 hours, 4 hours, 6 hours, 8 hours, or 10 hours.

According to an exemplary embodiment of the present invention, process step c) is carried out at 20° C. for at least 30 min. According to another exemplary embodiment the process step c) is carried out at 80° C. for at least 30 min.

According to another exemplary embodiment of the present invention, process step c) is carried out continuously in a rotor stator mixer at a temperature from 80 to 150° C., preferably at a temperature of 120° C., for 1 to 10 s, for example for 2 to 3 s, at industrial production rate of 2 to 5 tons of composite particles/hour.

According to another exemplary embodiment of the present invention, process step c) is split into a treatment and a heating step, wherein the treatment step comprises contacting the least one calcium carbonate containing mineral powder of step a) with at least one solution or emulsion or dispersion of the binder of step b). For example, the treatment step and the heating step can be carried out in parallel or the treatment step can be followed by the heating step.

According to one exemplary embodiment of the present invention, a homogenization step is carried out after the at least one calcium carbonate containing mineral powder was contacted with the at least one solution or emulsion or dispersion of the at least one binder of step b).

To ensure a better dispersion, a dispersant may also be added to any of the components used in the inventive process, e.g., in the form of an aqueous solution and/or a powder of a dispersant. A suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The weight average molecular weight $M_w$ of such products is preferably in the range from 2000 to 15000 g/mol, with a weight average molecular weight $M_w$ from 3000 to 7000 g/mol or 3500 to 6000 g/mol being especially preferred. According to an exemplary embodiment, the dispersant is sodium polyacrylate having a weight average molecular weight $M_w$ from 2000 to 15000 g/mol, preferably from 3000 to 7000 g/mol, and most preferably from 3500 to 6000 g/mol.

The Obtained Solid Calcium Carbonate Containing Composite Particles

According to one embodiment of the present invention, the solid content of the obtained solid calcium carbonate containing composite particles is at least 90 wt.-%, e.g., at least 95 wt.-%, preferably at least 99 wt.-%, more preferably at least 99.5 wt.-%, or most preferably at least 99.8 wt.-% or even >99.9 wt.-%, based on the total weight of the composite particles.

According to an optional embodiment, the inventive process comprises a further process step d), wherein the calcium carbonate containing composite particles obtained in step c) are dried.

The calcium carbonate containing composite particles may be dried, for example, thermally, e.g., by means of a spray drier or a microwave or in an oven, or mechanically, e.g., by filtration, or lowering the water content.

According to an optional embodiment of the invention, the calcium carbonate containing composite particles are dried in an oven at a temperature from 50 to 150° C., preferably from 80 and 120° C., and more preferably at a temperature of about 110° C.

According to another optional embodiment of the present invention, the obtained calcium carbonate containing composite particles are dried to a total surface moisture content of less than 1 wt.-%, less than 0.8 wt.-%, less than 0.5 wt.-%, preferably less than 0.2 wt.-%, and most preferably less than 0.1 wt.-%, based on the total weight of the composite particles, preferably, even after exposure for 48 hours at 23° C. to a moisture atmosphere having a relative humidity of 50%.

The dried calcium carbonate containing composite particles at a total surface moisture content of less than 0.5 wt.-%, based on the total weight of the composite particles, have increased bulk density at equal or improved flowability, compared to the calcium carbonate containing mineral powder provided in step a).

According to one embodiment of the present invention, the bulk density of the dried calcium carbonate containing composite particles at a total surface moisture content of less than 0.5 wt.-%, based on the total weight of the composite particles, is increased by 5 to 80%, preferably by 8 to 60%, and more preferably by 10 to 50%, compared to the calcium carbonate containing mineral powder provided in step a). The bulk density of the dried calcium carbonate containing composite particles may be, for example, from 0.5 to 1.0 kg/dm³, from 0.6 to 0.9 kg/dm³, or from 0.7 to 0.8 kg/dm³.

According to another embodiment of the present invention, the energy consumption that is required to move the dried calcium carbonate containing composite particles at a total surface moisture content of less than 0.5 wt.-%, based on the total weight of the composite particles, is decreased compared to the calcium carbonate containing mineral powder provided in step a).

According to an exemplary embodiment of the present invention, the energy consumption of the dried calcium carbonate containing composite particles at a total surface moisture content of less than 0.5 wt.-%, based on the total weight of the composite particles, is decreased by 0 to 40%, preferably by 5 to 30%, and more preferably by 10 to 20%, compared to the calcium carbonate containing mineral powder provided in step a). The energy consumption of the dried calcium carbonate containing composite particles may be, for example, from 1 to 20 kJ/t, from 4 to 16 kJ/t, or from 6 to 14 kJ/t.

The dried calcium carbonate containing composite particles of the present invention may be used in paper applications, in paints, or in plastics.

Optional Process Step: Contacting the at Least One Calcium Carbonate Containing Mineral Powder with at Least One Cationic Polymer According to a further optional embodiment of the present invention, the at least one calcium carbonate containing mineral powder provided in step a) is contacted before, during or after step c) with at least one solution or emulsion or dispersion of at least one cationic polymer. Without being bound to any theory, it is believed that the cationic polymer can improve the adhesion of the at least one binder on the calcium carbonate containing mineral powder.

According to one embodiment of the present invention, the at least one cationic polymer consists of a copolymer comprising as the monomer one or more dicarboxylic acids and one or more monomers from the group of diamines, triamines, dialkanolamines or trialkanolamines and epichlorohydrin.

Preferably saturated or unsaturated, branched or unbranched $C_2$-$C_{10}$-dicarboxylic acids, especially $C_3$-$C_9$-dicarboxylic acids, $C_4$-$C_8$-dicarboxylic acids, $C_5$-$C_7$-dicarboxylic acids, adipic acid in particular, are used as the dicarboxylic acid monomers.

Linear or branched, substituted and unsubstituted diamines and triamines, in particular N-(2-aminoethyl)-1,2-ethane-diamine, are especially suitable as the second monomer of the binder polymer.

Preferred dialkanolamines and trialkanolamines include, for example, diethanolamine, N-alkyldialkanolamines, e.g., N-methyl- and N-ethyl-diethanolamine and triethanolamine.

To monitor and control the molecular weight and/or chain length of the copolymer, one or more monovalent amines such as monoalkanolamines may be used during the polycondensation. According to a preferred embodiment monoethanolamine is used.

According to a preferred embodiment of the invention, the resulting intermediate copolymer is subsequently reacted with epichlorohydrin. According to another preferred embodiment the resulting intermediate copolymer has a weight average molecular weight $M_w$ from 800 to 1200 g/mol, preferably from 900 to 1100 g/mol or from 950 to 1050 g/mol, before it is reacted with epichlorohydrin.

According to another embodiment of the present invention, the at least one cationic polymer is a polyethylenimine (PEI) being selected from the group comprising branched polyethylenimines, linear polyethylenimines and mixtures of the foregoing. Preferably, the ratio of primary, secondary and tertiary amine functions in the inventive branched polyethylenimines is in the range of 1:0.86:0.42 to 1:1.20:0.76, prior to a possible modification of the branched polyethylenimines.

According to one preferred embodiment of the present invention, the at least one polyethylenimine is selected from the group of modified and unmodified polyethylenimines.

Examples for suitable polyethylenimines are homopolymers of ethylenimine (aziridine) or its higher homologues and also the graft polymers of polyamidoamines or polyvinylamines with ethylenimine or its higher homologues. The polyethylenimines can be crosslinked or uncrosslinked, quaternized and/or modified by reaction with alkylene oxides, dialkyl or alkylene carbonates or $C_1$-$C_8$-carboxylic acids. The polyethylenimines may be modified by reaction with alkylene oxides such as ethylene oxide, propylene oxide or butylene oxide, dialkyl carbonates such as dimethyl carbonate and diethyl carbonate, alkylene carbonates such as ethylene carbonate or propylene carbonate, or $C_1$-$C_8$-carboxylic acids. Modified PEIs can include alkoxylated polyethylenimines such as propoxylated polyethylenimines (PPEIs) and ethoxylated polyethylenimines (EPEIs). Further preferred modified polyethylenimines can be obtained by reacting the unmodified PEIs with one or more $C_1$-$C_{28}$-fatty acids, preferably with one or more $C_6$-$C_{18}$-fatty acids and especially preferred with $C_{10}$-$C_{14}$-fatty acids, like, e.g., coconut fatty acid. One method of making a cationic polymer comprising PEIs is based on the reaction of ethylenediamine (EDA) and ethylenimine (EI) under acid catalysis, in solvents such as water. An example of a common ethylenimine is aziridine. The resulting polyethylenimines (PEIs) in the composition have primary, secondary, and tertiary amine functionalities that are available for further chemical conversion, e.g., alkoxylation with alkylene oxides such as ethylene oxide to form APEI. The PEIs also may be made from a di- or polyamine such as ethylene diamine (EDA), ethylenimine (EI) such as aziridine, water, and an acid catalyst.

According to a preferred embodiment of the present invention, the at least one cationic polymer comprises a modified polyethylenimine, preferably modified with a carboxylic acid group, more preferably with one or more $C_1$-$C_{28}$-fatty acids, one or more $C_6$-$C_{18}$-fatty acids or with one or more $C_{10}$-$C_{14}$-fatty acids, or is modified by alkoxylation, preferably by ethoxylation, more preferably by ethoxylation with 10 to 50 ethylene oxide group.

In a preferred embodiment of the present invention, the polyethylenimine has a weight average molecular weight $M_w$ in the range of 100 g/mol and 10000 g/mol. In another preferred embodiment of the present invention the polyethylenimine is selected from the group of linear polyethylenimines having a weight average molecular weight $M_w$ from 100 to 700 g/mol, and preferably from 146 to 232 g/mol, and preferably is selected from triethylenetetramine, pentaethylenehexamine and tetraethylenepentamine. According to another preferred embodiment the polyethylenimine is selected from the group of branched polyethylenimines having a weight average molecular weight $M_w$ from 500 to 8000 g/mol and preferably from 800 to 1200 g/mol.

According to one exemplary embodiment of the present invention, a copolymer of adipic acid with N-(2-aminoethyl)-1,2-ethanediamine and epichlorohydrin is used as the at least one cationic polymer. According to a preferred embodiment of the present invention, the at least one cationic polymer is selected from a linear polyethylenimine, or a polyamine amide epichlorohydrin, or mixtures thereof.

Preferably a polyamine amide epichlorohydrin is used as the at least one cationic polymer.

According to a preferred embodiment of the present invention, the at least one calcium carbonate containing mineral powder provided in step a) is contacted before, during or after step c) with at least one solution or emulsion or dispersion of a cationic polymer, wherein the at least one binder is an anionic binder. Without being bound to any theory, it is believed that the combination of a cationic polymer with an anionic binder can further improve the adhesion of the at least one binder on the calcium carbonate containing mineral powder.

According to one embodiment of the present invention, the amount of the at least one cationic polymer used in the inventive process is less than 1.0 wt.-%, preferably less than 0.8 wt.-%, more preferably less than 0.5 wt.-%, and most preferably less than 0.2 wt.-%, based on the total weight of the calcium carbonate containing mineral powder.

According to one embodiment of the present invention, the at least one cationic polymer is provided in an aqueous form, e.g., in the form of a water-based solution or emulsion or dispersion.

In case the at least one cationic polymer is provided in the form of a dispersion, the particle size of the cationic polymer can have a $d_{50}$ value from 10 to 500 nm, preferably from 20 to 100, and more preferably from 25 to 80 nm.

According to one embodiment of the present invention, the at least one solution or emulsion or dispersion of the cationic polymer comprises 5 to 70 wt.-% of the at least one cationic polymer, preferably 10 to 50 wt.-%, and more preferably 12 to 17 wt.-%, based on the total weight of the solution or emulsion or dispersion.

According to a preferred embodiment of the present invention, the at least one cationic polymer is provided in form of a water-based solution, preferably comprising from 10 to 50 wt.-%, more preferably from 11 to 30 wt.-%, and most preferably from 12 to 17 wt.-% of the at least one cationic polymer based on the total weight of the solution.

However, the at least one cationic polymer also may be provided in form of an emulsion or a dispersion or in form of a mixture of a solution and/or an emulsion and/or a dispersion.

According to one embodiment of the present invention, the amount of the at least one solution or emulsion or dispersion of the at least one cationic polymer used in the inventive process is less than 1.0 wt.-%, preferably less than 0.8 wt.-%, more preferably less than 0.5 wt.-%, and most preferably less than 0.2 wt.-%, based on the total weight of the calcium carbonate containing mineral powder.

The contacting of the at least one calcium carbonate containing mineral powder with the at least one solution or emulsion or dispersion of the cationic polymer may be carried out under mixing and/or homogenizing conditions. The mixing and/or homogenizing conditions may be the same as those described above for process step c).

According to one embodiment, the at least one calcium carbonate containing mineral powder is preheated before it is contacted with at least one solution or emulsion or dispersion of the cationic polymer.

According to one embodiment of the present invention, the at least one calcium carbonate containing mineral powder is contacted with the at least one solution or emulsion or dispersion of the at least one cationic polymer before process step c). According to another embodiment of the present invention, the at least one calcium carbonate containing mineral powder is contacted with the at least one solution or emulsion or dispersion of the at least one cationic polymer during process step c). According to still another embodiment of the present invention, the at least one calcium carbonate containing mineral powder is contacted with the at least one solution or emulsion or dispersion of the at least one cationic polymer after process step c). Preferably, the at least one calcium carbonate containing mineral powder is contacted with the at least one solution or emulsion or dispersion of the at least one cationic polymer before process step c).

According to one exemplary embodiment of the present invention, a homogenization step is carried out after the at least one calcium carbonate containing mineral powder was contacted with the at least one solution or emulsion or dispersion of the cationic polymer and before the contacting with the at least one solution or emulsion or dispersion of the binder of step b). According to another exemplary embodiment of the present invention, a homogenization step is carried out after the at least one calcium carbonate containing mineral powder was contacted with the at least one solution or emulsion or dispersion of the binder of step b) and before the contacting with the at least one solution or emulsion or dispersion of the cationic polymer.
Further Optional Process Steps According to a further optional embodiment, the inventive process comprises a further process step e), wherein the dried calcium carbonate containing composite particles are screened and/or air classified to eliminate undesirable large particles. The screening may be carried out using a screening machine, e.g., circle-through vibrating screening equipment, a high frequency vibrating equipment or a gyratory equipment. The air classification may be carried out using an air classifier which sorts materials by a combination of size, shape and density and works by injecting the material stream to be sorted into a chamber which contains a column of rising air. Due to the dependence of air drag on object size and shape, the material particles in the moving air column are sorted vertically and can be separated in this manner.

According to one optional embodiment of the present invention, particles being greater than 100 µm, preferably being greater than 50 µm, and more preferably being greater than 20 µm are eliminated. Preferably, the undesirable large particles are eliminated in the obtained dried calcium carbonate containing composite particles to an amount below 1000 ppm, more preferably to an amount below 100 ppm, e.g., to below 50 and 80 ppm or 60 and 70 ppm.

According to another optional embodiment, a slurry is prepared from the calcium carbonate containing composite particles obtained by step c) by addition of water.

Optionally, a dispersant can be used to prepare the slurry. The dispersant may be used in an amount from 0.01 to 10 wt.-%, 0.05 to 8 wt.-%, 0.5 to 5 wt.-%, 0.8 to 3 wt.-%, or 1.0 to 1.5 wt.-%, based on the total weight of the calcium carbonate containing composite particles. In a preferred embodiment, the pigment is dispersed with an amount of 0.05 to 5 wt.-%, and preferably with an amount of 0.5 to 5 wt.-% of a dispersant, based on the total weight of the composite particles. A suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The weight average molecular weight $M_w$ of such products is preferably in the range from 2000 to 15000 g/mol, with a weight average molecular weight $M_w$ from 3000 to 7000 g/mol or 3500 to 6000 g/mol being especially preferred. According to an exemplary embodiment, the dispersant is sodium polyacrylate having a weight average molecular weight $M_w$ from 2000 to 15000 g/mol, preferably from 3000 to 7000 g/mol, and most preferably from 3500 to 6000 g/mol.

The slurry prepared from the calcium carbonate containing composite particles may have a solid content from 10 to 82 wt.-%, preferably from 50 to 81 wt.-%, and more preferably from 60 to 70 wt.-% or from 70 to 78 wt.-%, based on the total weight of the slurry.

EXAMPLES

The following examples show different calcium carbonate containing composite particles which were prepared according to the inventive process.
A. Materials
Calcium Carbonate Containing Mineral Powders:

Calcium carbonate 1: At 25 wt.-%, based on the total weight of the slurry, wet ground and spray dried marble of the region of Carrara, Italy, particle size ($d_{50}$): 1.8 µm.

Calcium carbonate 2: Dry ground marble of the region of Carrara, Italy, particle size ($d_{50}$): 3.4 µm.

Calcium carbonate 3: Dry ground marble of the region of Carrara, Italy, particle size ($d_{50}$): 5.3 µm.

Calcium carbonate 4: Dry ground marble of the region of Villach, Austria, particle size ($d_{50}$): 2.6 µm.

Calcium carbonate 5: Dry ground chalk of the region of Denmark, particle size ($d_{50}$): 2.4 µm.
Cationic Polymers:

Cationic polymer 1: Linear polyethylenimine, concentration: >99%

Cationic polymer 2: Polyamine amide epichlorohydrin dissolved in water, concentration: 15 wt.-% based on the total weight of the solution.
Binders:

Binder 1: Styrene-acrylate-copolymer dispersed in water, concentration: 50 wt.-% based on the total weight of the dispersion.

Binder 2: Styrene-butadiene-copolymer dispersed in water, concentration: 50 wt.-% based on the total weight of the dispersion.
Dispersant 1:

Sodium polyacrylate, $M_w$=3500 g/mol
B. Methods:
Treatment Process 1

3000 g $CaCO_3$ powder were placed in a Lödige mixer (Gebrüder Lödige Maschinenbau GmbH, Germany) and the cationic polymer solution was added while the mixer was running. After a homogenization step of 5 min, the binder dispersion was added and the mixture was homogenized for additional 30 min. In case no cationic polymer was used, the binder dispersion was added at the beginning instead of the cationic polymer.

The obtained product was tempered in a drying oven at 110° C. for 15 hours.
Treatment Process 2

3000 g $CaCO_3$ powder were preheated in a drying oven at 80° C. for 2 hours. Subsequently the $CaCO_3$ was placed in a Lödige mixer (Gebrüder Lödige Maschinenbau GmbH, Germany) which has been preheated up to 80° C. and the cationic polymer solution was added while the mixer was running. After a homogenization step of 5 min, the binder dispersion was added and the mixture was homogenized for additional 30 min. During the whole treatment process, the temperature in the Lödige mixer was kept at 80° C. Cationic polymer and binder were not preheated. In case no cationic polymer was used, the binder dispersion was added at the beginning instead of the cationic polymer.

The obtained product was tempered in a drying oven at 110° C. for 15 hours.
Treatment Process 3

500 g $CaCO_3$ powder were placed into a mixer type M3/1.5 (MTI Mischtechnik International GmbH, Germany) and the mixing was activated at 500 rpm. Thereafter the cationic polymer solution and the binder dispersion were introduced to the $CaCO_3$ powder at room temperature. The contents of the mixer were mixed under a stirring speed of 500 rpm for a period of 10 or 20 min.

The obtained product was tempered in a drying oven at 110° C. for 15 hours.
Measurement of the Conditioned Bulk Density (CBD)

The conditioned bulk density was measured with the Powder Rheometer System FT4 (Freeman Technology Ltd., UK) which allows the powder to be conditioned to establish a low stress homogeneous packaging state.

The conditioning process involved gentle displacement of the whole sample in order to loosen and slightly aerate the powder in order to construct a homogenously packed powder bed. A conditioning cycle comprised a traverse of the blade downward and then a traverse upward. The downward traverse used a 5° positive helix in order that the blade action was more slicing than compacting. The upward traverse used a 5° negative helix that gently lifted the powder and dropped it over the blade, each particle coming to rest behind it. After the conditioning cycle, the powder sample was free of localised stress and any excess air.

Subsequently, a sample corresponding to a volume of 160 ml was weighed using the Powder Rheometer System FT4 in-built balance and the conditioned bulk density was automatically calculated by the rheometer.

Measurement of the Energy Consumption for Powder Movement

The energy that is required to move one metric ton of powder was determined using the Powder Rheometer System FT4 (Freeman Technology Ltd., UK) and a specific sequence of the stability (Rep) and variable flow rate (VFR) test sequences, which are provided by the Powder Rheometer System FT4.

The structure of the Rep+VFR test was a combination of seven conditioning and test cycles of the stability test and four conditioning and test cycles of the variable flow rate test as illustrated below:

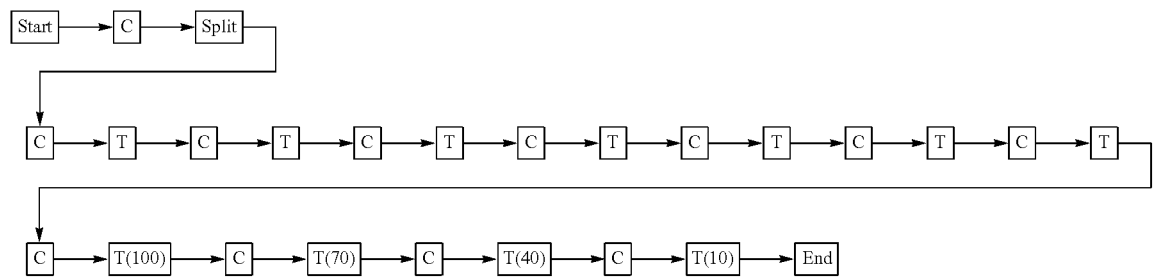

where C=conditioning cycle, T=test cycle, (x)=blade tip speed during the test cycle (mm/s), and Split=splitting of vessel to provide precise volume of powder for measurement. The powder mass was automatically recalculated after splitting. The blade tip speed was 100 mm/s where not defined in brackets (during Rep sequence).

An average "total energy consumption" in mJ was obtained from test numbers 4 to 8 and converted into an energy consumption in kJ/t by dividing the average total energy consumption by the weight of the measured sample.

Measurement of the Brookfield Viscosity

The Brookfield viscosity was measured using a Brookfield DVII+ viscometer at 100 rpm and 23° C.

Measurement of the Particle Size

For the determination of the weight median particle size $d_{50}$, a Sedigraph 5100 device from the company Micromeritics, USA was used. The measurement was performed in an aqueous solution of 0.1 wt.-% $Na_4P_2O_7$. The samples were dispersed using a high-speed stirrer and ultrasound.

Measurement of the Total Surface Moisture Content

The total surface moisture content was determined according to the Coulometric Karl Fischer measurement method, wherein the dried calcium carbonate containing composite particle was heated to 220° C., and the water content released as vapour and isolated using a stream of nitrogen gas (at 100 ml/min) was determined in a Coulometric Karl Fischer unit.

C. Results

Example 1

2000 g of calcium carbonate 1 was treated using treatment process 2, at which 0.5 wt.-% of cationic polymer 1 and 8 wt.-% of binder 2 were added, wherein the weight percent are based on the total weight of the calcium carbonate.

The inventive product showed a higher bulk density and a lower energy needed to move the product compared to the untreated calcium carbonate:

| composition | | Bulk density (kg/dm$^3$) | Energy consumption (kJ/t) |
|---|---|---|---|
| prior art | 99.8 wt.-% calcium carbonate 1<br>0.2 wt.-% moisture | 0.50 | 14.2 |
| invention | 91.3 wt.-% calcium carbonate 1<br>0.5 wt.-% cationic polymer 1<br>8.0 wt.-% binder 2<br>0.2 wt.-% moisture | 0.80<br>(+60%) | 12.2<br>(−14.1%) |

Example 2

2000 g of calcium carbonate 2 was surface treated using treatment process 1, at which 0.2 wt.-% of cationic polymer 2 and 3 wt.-% of binder 1 were added, wherein the weight percent are based on the total weight of the calcium carbonate.

The inventive product showed a higher bulk density and a lower energy needed to move the product compared to the untreated calcium carbonate:

| composition | | Bulk density (kg/dm$^3$) | Energy consumption (kJ/t) |
|---|---|---|---|
| prior art | 99.8 wt.-% calcium carbonate 2<br>0.2 wt.-% moisture | 0.76 | 7.0 |
| invention | 96.6 wt.-% calcium carbonate 2<br>0.2 wt.-% cationic polymer 2<br>3.0 wt.-% binder 1<br>0.2 wt.-% moisture | 0.82<br>(+7.9%) | 4.6<br>(−34.4%) |

Example 3

Product A 3000 g of calcium carbonate 3 was surface treated using treatment process 1, at which 0.2 wt.-% of cationic polymer 2 and 3 wt.-% of binder 1 were added, wherein the weight percent are based on the total weight of the calcium carbonate.

Product B 500 g of calcium carbonate 3 was surface treated using treatment process 3, at which 3 wt.-% of binder 1 was added, wherein the weight percent are based on the total weight of the calcium carbonate.

The inventive products showed a higher bulk density and a lower energy needed to move the product compared to the untreated calcium carbonate:

|  | composition | Bulk density (kg/dm³) | Energy consumption (kJ/t) |
|---|---|---|---|
| prior art | 99.8 wt.-% calcium carbonate 3<br>0.2 wt.-% moisture | 0.85 | 5.6 |
| inventive product A | 96.6 wt.-% calcium carbonate 3<br>0.2 wt.-% cationic polymer 2<br>3.0 wt.-% binder 1<br>0.2 wt.-% moisture | 0.92<br>(+8.2%) | 4.9<br>(−12.5%) |
| inventive product B | 96.6 wt.-% calcium carbonate 3<br>3.0 wt.-% binder 1<br>0.2 wt.-% moisture | 0.94<br>(+10.6%) | 3.6<br>(−35.7%) |

Example 4

3000 g of calcium carbonate 5 was surface treated using treatment process 1, at which 0.2 wt.-% of cationic polymer 2 and 3 wt.-% of binder 1 were added, wherein the weight percent are based on the total weight of the calcium carbonate.

The inventive product showed a higher bulk density and a lower energy needed to move the product compared to the untreated calcium carbonate:

|  | composition | Bulk density (kg/dm³) | Energy consumption (kJ/t) |
|---|---|---|---|
| prior art | 99.6 wt.-% calcium carbonate 5<br>0.4 wt.-% moisture | 0.46 | 13.9 |
| inventive | 96.4 wt.-% calcium carbonate 5<br>0.2 wt.-% cationic polymer 2<br>3.0 wt.-% binder 1<br>0.4 wt.-% moisture | 0.62<br>(+34.8%) | 10.9<br>(−21.6%) |

Example 5

Product C 2000 g of calcium carbonate 4 was surface treated using treatment process 2, at which 0.2 wt.-% of cationic polymer 2 and 2 wt.-% of binder 1 were added, wherein the weight percent are based on the total weight of the calcium carbonate.

Product D 2000 g of calcium carbonate 4 was surface treated using treatment process 1, at which 0.2 wt.-% of cationic polymer 1 and 2 wt.-% of binder 1 were added, wherein the weight percent are based on the total weight of the calcium carbonate.

Product E 2000 g of calcium carbonate 4 was surface treated using treatment process 1, at which 0.2 wt.-% of cationic polymer 2 and 5 wt.-% of binder 1 were added, wherein the weight percent are based on the total weight of the calcium carbonate.

The inventive products showed a higher bulk density and a similar or lower energy needed to move the product compared to the untreated calcium carbonate:

|  | Composition | Bulk density (kg/dm³) | Energy consumption (kJ/ton) |
|---|---|---|---|
| prior art | 99.8 wt.-% calcium carbonate 4<br>0.3 wt.-% moisture | 0.72 | 6.4 |
| inventive product C | 97.5 wt.-% calcium carbonate 4<br>0.2 wt.-% cationic polymer 2<br>2.0 wt.-% binder 1<br>0.3 wt.-% moisture | 0.79<br>(+9.7%) | 6.4<br>(−0%) |
| inventive product D | 97.5 wt.-% calcium carbonate 4<br>0.2 wt.-% cationic polymer 1<br>2.0 wt.-% binder 1<br>0.3 wt.-% moisture | 0.78<br>(+8.3%) | 5.4<br>(−15.6%) |
| inventive product E | 94.5 wt.-% calcium carbonate 4<br>0.2 wt.-% cationic polymer 2<br>5.0 wt.-% binder 1<br>0.3 wt.-% moisture | 0.90<br>(+25.0%) | 6.0<br>(−6.3%) |

Example 6

A slurry having 65 wt.-% solids was prepared using 2000 g of the product of example 2 and 0.03 wt.-% of dispersant 1, based on the weight of the dry $CaCO_3$.

The Brookfield viscosity of the obtained slurry was 620 mPas.

Example 7

A slurry having 65 wt.-% solids was prepared using 2000 g of the product A of example 3 and 0.03 wt.-% of dispersant 1, based on the weight of the dry $CaCO_3$.

The Brookfield viscosity of the obtained slurry was 510 mPas.

The invention claimed is:

1. A process for preparing calcium carbonate containing composite particles comprising the following steps:
    a) providing at least one calcium carbonate containing mineral powder,
    b) preparing at least one solution or emulsion or dispersion of at least one binder selected from the group consisting of copolymers of acrylonitrile, butadiene, acrylate, butyl acrylate, styrene, styrene-butadiene, and acrylic ester, and any mixture thereof, wherein the amount of binder is less than 10 wt. %, based on the total weight of the calcium carbonate containing mineral material, and
    c) contacting the at least one calcium carbonate containing mineral powder of step a) with the at least one solution or emulsion or dispersion of the binder of step b) in an amount to form calcium carbonate containing composite particles having a solids content of at least 90 wt. % based on the total weight of the calcium carbonate composite particles,
    wherein the calcium carbonate containing composite particles, when dried to achieve a total surface moisture content of less than 0.5 wt.-%, based on the total weight of the composite particles, have increased bulk density at equal or improved flowability compared to the calcium carbonate containing mineral powder provided in step a) when dried to achieve a total surface moisture content of less than 0.5 wt.-%.

2. The process of claim 1, wherein the calcium carbonate containing composite particles, when dried to achieve a total surface moisture content of less than 0.5 wt.-%, based on the total weight of the composite particles, have a bulk density that is increased by 5 to 80%, compared to the calcium carbonate containing mineral powder provided in step a) when dried to achieve a total surface moisture content of less than 0.5 wt.-%.

3. The process of claim 1, wherein the at least one calcium carbonate containing mineral powder provided in step a) is selected from the group consisting of ground calcium carbonate (GCC), precipitated calcium carbonate (PCC), and a mixture thereof.

4. The process of claim 1, wherein the at least one calcium carbonate containing mineral powder provided in step a) consists of powder particles having a $d_{50}$ value from 0.1 to 100 μm.

5. The process of claim 1, wherein the at least one calcium carbonate containing mineral powder provided in step a) has a total surface moisture content of less than 5 wt.-%, based on the total weight of the mineral powder.

6. The process of claim 1, wherein the at least one calcium carbonate containing mineral powder provided in step a) has a total surface moisture content of less than 2 wt.-%, based on the total weight of the mineral powder.

7. The process of claim 1, wherein the at least one calcium carbonate containing mineral powder provided in step a) has a total surface moisture content of less than 1 wt.-%, based on the total weight of the mineral powder.

8. The process of claim 1, wherein the at least one calcium carbonate containing mineral powder provided in step a) has a total surface moisture content of less than 0.5 wt.-%, based on the total weight of the mineral powder.

9. The process of claim 1, wherein the at least one calcium carbonate containing mineral powder provided in step a) has a total surface moisture content of less than 0.2 wt.-%, based on the total weight of the mineral powder.

10. The process of claim 1, wherein the at least one calcium carbonate containing mineral powder provided in step a) has a total surface moisture content of less than 0.1 wt.-%, based on the total weight of the mineral powder.

11. The process of claim 1, wherein the at least one binder provided in step b) is styrene-acrylate-copolymer, styrene-butadiene-copolymer, or a mixture thereof.

12. The process of claim 1, wherein the amount of the at least one binder provided in step b) is less than 7 wt.-%, based on the total weight of the calcium carbonate containing mineral powder.

13. The process of claim 1, wherein the amount of the at least one binder provided in step b) is less than 5 wt.-%, based on the total weight of the calcium carbonate containing mineral powder.

14. The process of claim 1, wherein the amount of the at least one binder provided in step b) is between 0.1 and 4 wt.-%, based on the total weight of the calcium carbonate containing mineral powder.

15. The process of claim 1, wherein the at least one calcium carbonate containing mineral powder provided in step a) is contacted before, during or after step c) with at least one solution or emulsion or dispersion of at least one cationic polymer.

16. The process of claim 15, wherein the at least one cationic polymer is a linear polyethylenimine, a polyamine amide epichlorohydrin, or a mixture thereof.

17. The process of claim 15, wherein the amount of the at least one cationic polymer is less than 1.0 wt.-%, based on the total weight of the calcium carbonate containing mineral powder.

18. The process of claim 1, wherein the process step c) is carried out at a temperature of from 5° C. to 140° C.

19. The process of claim 1, wherein the calcium carbonate containing composite particles obtained in step c) are dried.

20. The process of claim 19, wherein the calcium carbonate containing composite particles obtained in step c) are dried to a total surface moisture content of less than 1 wt.-%, based on the total weight of the composite particles.

21. The process of claim 19, wherein the calcium carbonate containing composite particles obtained in step c) are dried to a total surface moisture content of less than 0.8 wt.-%, based on the total weight of the composite particles.

22. The process of claim 19, wherein the calcium carbonate containing composite particles obtained in step c) are dried to a total surface moisture content of less than 0.5 wt.-%, based on the total weight of the composite particles.

23. The process of claim 19, wherein the calcium carbonate containing composite particles obtained in step c) are dried to a total surface moisture content of less than 0.2 wt.-%, based on the total weight of the composite particles.

24. The process of claim 19, wherein the calcium carbonate containing composite particles obtained in step c) are dried to a total surface moisture content of less than 0.1 wt.-%, based on the total weight of the composite particles.

25. The process of claim 19, wherein the dried calcium carbonate containing composite particles are screened and/or air classified to eliminate particles being greater than 100 μm.

26. The process of claim 19, wherein the dried calcium carbonate containing composite particles are screened and/or air classified to eliminate particles being greater than 50 μm.

27. The process of claim 19, wherein the dried calcium carbonate containing composite particles are screened and/or air classified to eliminate particles being greater than 20 μm.

28. The process of claim 1, wherein a slurry is prepared from the calcium carbonate containing composite particles obtained in step c) by addition of water and, optionally, a dispersant.

29. The process of claim 1, wherein a slurry is prepared from the calcium carbonate containing composite particles obtained in step c) by addition of water a dispersant, wherein the dispersant is sodium polyacrylate having a weight average molecular weight $M_w$ from 2000 to 15000 g/mol.

30. The process of claim 28, wherein the slurry has a solid content from 10 to 82 wt.-%, based on the total weight of the slurry.

31. The process of claim 1, wherein step c) is carried out in a milling device or a ball mill, optionally in combination with a cyclone device that re-circulates agglomerates and/or aggregates formed during step c) back to an inlet of the milling device or ball mill.

32. The process of claim 1, wherein the calcium carbonate containing composite particles formed during step c) are divided into smaller particles.

* * * * *